United States Patent [19]

Nall

[11] Patent Number: 5,422,916
[45] Date of Patent: Jun. 6, 1995

[54] PARTIAL FRAME DETECTOR

[75] Inventor: David C. Nall, Lawrence, Kans.

[73] Assignee: Relm Communications, Inc., West Melbourne, Fla.

[21] Appl. No.: 947,221

[22] Filed: Sep. 18, 1992

[51] Int. Cl.$^6$ .............................................. H04L 7/00
[52] U.S. Cl. .................................. 375/368; 370/105.4
[58] Field of Search ................... 375/96, 114, 116; 370/105.1, 105.4, 106; 371/38.1, 39.1, 5.1, 44, 5.4

[56]  References Cited

U.S. PATENT DOCUMENTS 3,766,316  10/1973  Hoffman et al. ................. 375/116
4,649,543   3/1987  Levine ............................. 371/5.1
4,821,292   4/1989  Childress ......................... 375/114

Primary Examiner—Stephen Chin
Assistant Examiner—Tesfaldet Bocure
Attorney, Agent, or Firm—Allegretti & Witcoff, Ltd.

[57] ABSTRACT

A partial frame detector provides detection of a frame synchronization pattern in an environment of burst noise that prohibits detection by correlation. A frame synchronization pattern capable of sustaining a minimum of 17 bits clustered in error plus random errors while still providing frame detection is achieved by utilizing a 64 bit Barker derived frame synchronization pattern and an additional process included in a correlation algorithm.

8 Claims, 2 Drawing Sheets

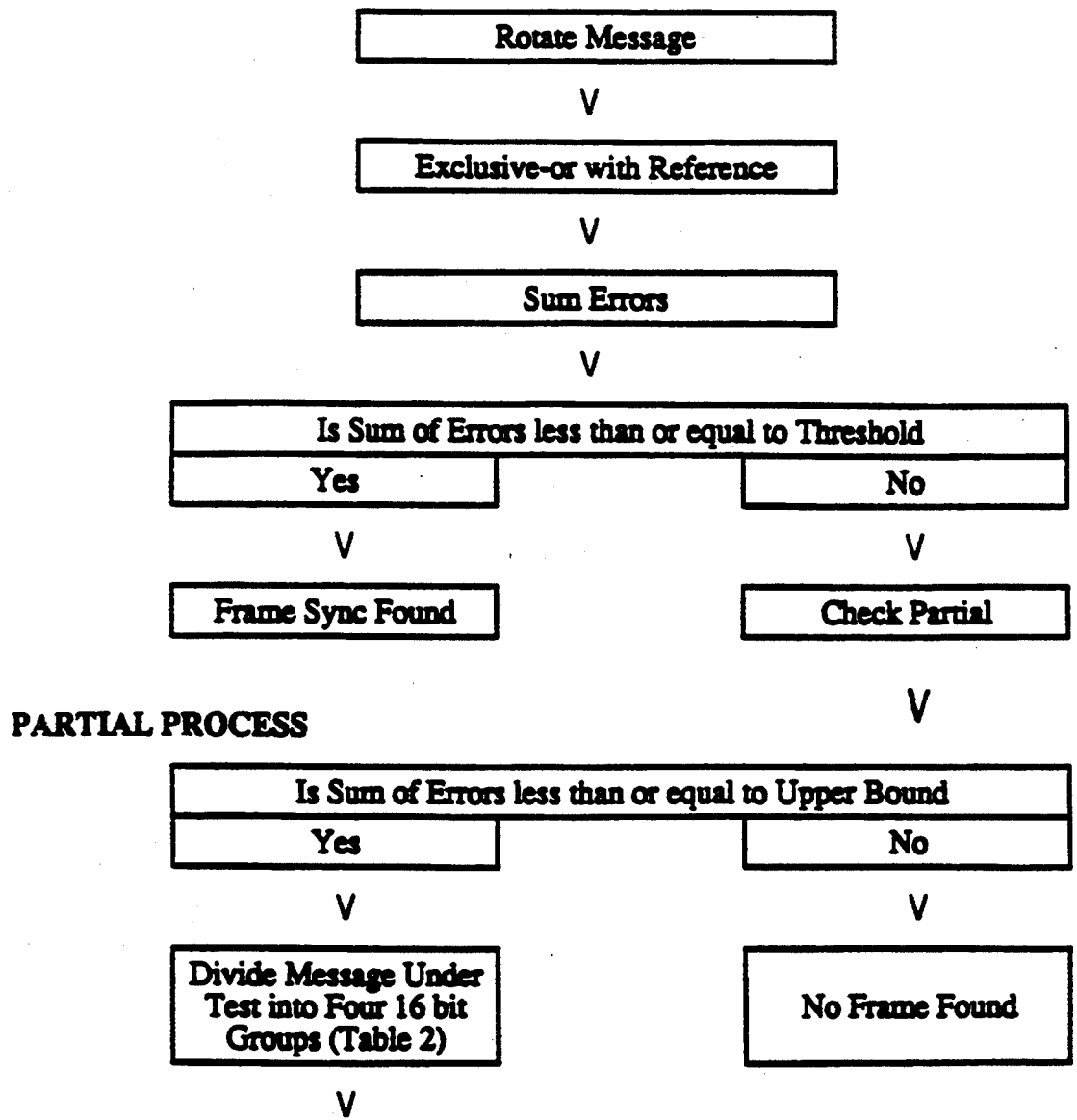

Fig. 1b

```
┌─────────────────────────────┐
│ Combine First and Second    │
│ Combine Second and Third    │
│ Combine Third and Forth     │
│ Combine First and Third     │
│ Combine Second and Forth    │
│ Combine First and Forth     │
└─────────────────────────────┘
              V
```

| Tag #1 Last Combination? ||
|---|---|
| No | Yes |

V (No) → Find Errors in Combination
V (Yes) → GOTO Tag #2

V

Sum Errors in Combination

V

| Is Combination Sum of Errors less than or equal to Partial Threshold ||
|---|---|
| Yes | No |

V (Yes) → Add 1 to Partial Counter ----------> 
V (No) → GOTO Tag #1

| Tag #2 Is Partial Counter greater than or equal to Counter Threshold ||
|---|---|
| Yes | No |

V (Yes) → Frame Sync Found
V (No) → No Frame Found

PARTIAL FRAME DETECTOR

BACKGROUND OF THE INVENTION

1. Field of the Invention

The present invention relates to frame detection and more particularly to detection of a frame synchronization pattern in an environment of burst noise that prohibits detection by correlation.

2. Description of the Prior Art

Typically, frame detection is performed by correlation. The captured incoming bit pattern is exclusive-ored with a known reference pattern. This results in the placement of ones at all locations in the captured incoming bit pattern where there are differences. Adding up the number of ones provides an indication of how closely the two bit patterns match or correlate. For the original bit pattern, an error of zero to one bit, provides an acceptable frame error rate. However, when Rayleigh fading is added to the channel (high speed rates) the burst errors appear in clusters of four bits or more. With a possible correlation threshold of one bit in error, a frame synchronization pattern can not be detected. Thus, an improved detector of a frame synchronization pattern is required.

It is an object of the present invention to provide a frame detector that has the ability to detect a frame synchronization pattern in an environment of burst noise that prohibits detection by correlation.

SUMMARY OF THE INVENTION

The partial frame detector of the present invention provides the ability to detect a frame synchronization pattern in an environment of burst noise that prohibits detection by correlation. The average types of errors that are found on a Rayleigh fading channel are burst errors from four bits to 17 bits plus background errors, based on the bit error rate. The burst errors are separated by strings of good bits that average from 21 bits to 84 bits also with background errors randomly inserting single bit errors in the strings. A frame synchronization pattern must be able to sustain at a minimum 17 bits clustered in error plus random errors and still provide frame detection. The solution to this situation, as described by the present invention, is the utilization of a 64 bit Barker derived frame synchronization pattern and an additional process included in the correlation algorithm.

The normal frame detection process will find frame synchronization if there are 13 errors in a 64 bit frame synchronization pattern. The partial frame detector of the present invention will detect frame synchronization if there are 19 clustered errors and four random errors (23 total errors) in a 64 bit frame synchronization pattern.

BRIEF DESCRIPTION OF THE DRAWINGS

FIG. 1a illustrates a first portion of a flow diagram of one embodiment of the present invention.

FIG. 1b illustrates a second portion of a flow diagram of the embodiment of the present invention referred to above in connection with FIG. 1a.

DETAILED DESCRIPTION OF THE INVENTION

A DMX (trunked data radio) message typically contains modem synchronization, frame synchronization, addressing, text, and error correction information. The performance of recovery of the message in a low signal level, Rayleigh fading environment (8-20 dB SINAD), should be at least as high as voice. To improve message recovery performance at low signal levels, two parts of the message structure must be improved. First, the frame synchronization size and detection algorithm and second the error correction implementation, time diversity and the recommendation of correction code.

FIGS. 1a and 1b together illustrate a flow diagram of one embodiment of the partial frame detector of the present invention. The partial frame detection process begins by rotating the DMX message, exclusive-oring the message with a reference, and summing the errors. If the sum of the errors is less than or equal to a specified threshold, then frame synchronization has been found. If the sum of the errors is not less than or equal to the threshold, then the partial process is utilized. The partial process begins by establishing whether the sum of the errors is less than or equal to the upper bound. If the sum of the errors is not less than or equal to the upper bound, then no frame synchronization has been found. If the sum of the errors is less than or equal to the upper bound, then the message under test is divided into four 16 bit groups, as illustrated in Table 1.

TABLE 1

| 16 bits | 16 bits | 16 bits | 16 bits |
|---|---|---|---|
| First | Second | Third | Fourth |

The four 16 bit groups are then rearranged by combining the first and second groups, second and third groups, third and fourth groups, first and third groups, second and fourth groups, and the first and fourth groups defining a set number of combinations including a last combination. Each of the combined bit groups is then analyzed for errors. Tag No. 1 establishes whether there was a last combination has been analyzed. If the last combination has been analyzed, then the software flow diagram skips to Tag No. 2. If a last combination has not been analyzed, then the partial process finds the errors in the combination next and sums the errors in the combination. If the combination sum of errors is less than or equal to a specified partial threshold, then a one is added to a partial counter. If the combination sum of errors is not less than or equal to a partial threshold, then the software flow diagram returns to Tag No. 1. Tag No. 2 establishes whether the partial counter is greater than or equal to the counter threshold. If it is, then frame synchronization is found. If it is not, then no frame synchronization has been found.

TABLE 2

| Upper Bound | 25 |
|---|---|
| Threshold | 13 |
| Partial Treshold | 5 |
| Counter Threshold | 3 |

The text message, including addressing information, needs to have the periodic burst errors converted into random errors. The randomization of periodic errors is accomplished by interleaving. The step size for interleaving must be large enough to randomize periodic errors for the entire length of the text message over the speeds in question. Numbers for interleaving greater than the shortest average interval (40 MPH-25 bits) and less than twice the shortest average interval (40 MPH-50 bits). Thus, interleave numbers from 26 to 49 should provide sufficient randomization of periodic errors.

Interleave numbers tested for this embodiment of the invention where 33 bits and 41 bits.

The text message is buffered so that software can rotate the entire received bit pattern to find the frame synchronization pattern. Once the frame synchronization pattern has been found the text message bits can be deinterleaved. After deinterleaving the error correction can remove as many errors as the error correction code is capable. The maximum number of shifts before the frame synchronization pattern is not found can be limited. In this embodiment, a break out of the shift count of 140 is 64 for modem synchronization, 64 frame synchronization, and 10% of 128 bits.

The error correction for the address part of the text message needs a more robust error correction code than the text portion. The error correction is made up of two parts. The first part of the error correction is an inner code that is able to correct non-periodic random errors 6 bits or less in a 24 bit group. The inner error correction code needs to be easily implementable in software. The error correction code doubles the total number of address bits sent (new total 224). The intent is to make the recovery of addressing information better so that a mobile unit can more easily tell if a call was addressed to the unit even though the text is unusable. The new string of bits (112 original and 112 error correction) is appended to the front of the original text message bit string. The second, outer code, is implemented as part of the error correction for the text.

The text portion of the message is the actual information that is sent for display at the destination. The error correction for the text portion of the message is made up of a code that can correct non-periodic random errors 6 bits or less in a 24 bit group. The (outer) error correction code is used on all the bits from the text plus the addressing and inner error correction code bits.

The addition of 8 bits at the end of the message is to provide a buffer between the message and the termination of the data carrier. To provide time for last bits to clear various shift registers. The rate $\frac{1}{2}$ error correction system is comprised of a two tap multiplexed convolutional code encoder. The rate $\frac{1}{3}$ error correction system is comprised of a three tap multiplexed convolutional code encoder. The difference between the rate $\frac{1}{2}$ and rate $\frac{1}{3}$ is that the rate $\frac{1}{2}$ reduces the baseline BER by approximately 2 and a rate $\frac{1}{3}$ reduces the baseline BER by approximately 3. Table 3 shows the total bit size.

TABLE 3

| Function | TOTAL BIT SIZE | | | |
|---|---|---|---|---|
| | Original | Rate $\frac{1}{2}$ | Rate $\frac{1}{3}$ | |
| Modem Sync | 200 | 64 | 64 | Bits |
| Frame Sync | 15 | 64 | 64 | Bits |
| Address | 224 | 448 | 672 | Bits |
| Text | 512 | 512 | 768 | Bits |
| Tail | 0 | 8 | 8 | Bits |
| Total Bits | 951 | 1096 | 1576 | Bits |
| Total Time | 0.79 | 0.92 | 1.13 | Seconds |
| Effective Rate | 466 | 400 | 325 | Baud |
| Number of Bytes | 119 | 137 | 197 | Bytes |
| Rate Reduction | 0 | 14 | 30 | % |

The message does not need to be decoded in real time. However, this does require the use of double (triple, quadruple, etc.) buffering of incoming messages. A buffer area is needed for the deinterleaved message to be stored while error correction works on correcting any errors. A buffer area is needed for the error corrected message (address and text) to be stored prior to transfer to the display. Memory requirements for buffering of messages will be less than 2 kilobytes of static RAM (6116 static RAM 2K×8).

The error correction for the address bits is recommended to be a combination (concatenation) of several types of error correction. The inner code needs to be able to handle non-periodic short errors of 6 or less. The error correction for the text bits is recommended to be a combination (concatenation) of several types of error correction. The outer code needs to be able to handle non-periodic short burst errors of 6 bits or less.

A typical modem acquires synchronization within 8 bits of presentation of the data carrier. The modem utilized with this embodiment of the invention (Fujitsu MB87002) was set for slow synchronization acquisition of within 25 bits. The slow synchronization setting provides the longest possible delay for this device to obtain synchronization (worst case). By utilizing the present invention, the modem synchronization could be reduced from 200 bits to 64 bits while maintaining bit synchronization accuracy.

Table 4 shows the suggested DMX performance criteria based on test results (using the MB87002 Modem).

TABLE 4

| SINAD dB | FADING MPH | FRAME ACQUISITION % | BIT ERROR RATE BER |
|---|---|---|---|
| 8 | 10 | 80 | 4.38 × 10−1 |
| 12 | 10 | 89 | 2.50 × 10−1 |
| 20 | 10 | 99.9 | 6.70 × 10−1 |
| 20 + 20 | 10 | 99.9999 | Less than 10−5 |

Table 5 shows the non-faded performance test results (using the MB87002 Modem).

TABLE 5

| SINAD dB | FRAME ACQUISITION % | BIT ERROR RATE BER |
|---|---|---|
| 5 | 99.99 | 1.73 × 10−2 |
| 7 | 99.999 | 2.09 × 10−3 |
| 9 | 99.9999 | 1.10 × 10−4 |

It is not intended that this invention be limited to the software arrangement, or operational procedures shown disclosed. This invention includes all of the alterations and variations thereto as encompassed within the scope of the claims as follows.

I claim:

1. A method for providing partial frame synchronization bit pattern detection, comprising the steps of:
   (1) dividing a message under test into bit groups;
   (2) rearranging said bit groups into bit group combinations, including a first bit group combination and a last bit group combination;
   (3) identifying errors in the first bit group combination;
   (4) summing said errors in said first bit group combination to arrive at a combination sum of errors for said first bit group combination;
   (5) identifying errors in the next bit group combination;
   (6) summing said errors in said next bit group combination to arrive at a combination sum of errors for said next bit group combination;
   (7) Repeating steps 5 and 6 until the errors in the last bit group combination have been identified and summed;

(8) counting said bit group combinations having a combination sum of errors less than or equal to a partial threshold to arrive at a partial counter number; and (9) establishing whether said partial counter number is less than or equal to a counter threshold whereby if the counter number is less than or equal to the counter threshold that frame synchronization is found.

2. A method for providing partial frame synchronization bit pattern detection as in claim 1, including the step of dividing said message under test into bit groups such that each of said bit groups has an equal number of bits.

3. A method for providing partial frame synchronization bit pattern detection as in claim 1, including the step of identifying said errors in each of said bit group combinations by exclusive-ORing said bit group combinations with a reference.

4. A method for providing partial frame synchronization bit pattern detection as in claim 1, including the step of rearranging said bit groups into bit group combinations comprising unique pairs of said bit groups.

5. A method for providing partial frame synchronization bit pattern detection as in claim 1, including a step of rotating a received bit pattern from which said message under test originated prior to dividing a message under test into bit groups.

6. A method for providing partial frame synchronization bit pattern detection as in claim 1, including the steps of identifying errors in said message under test prior to dividing a message under test into bit groups, summing said errors identified in said message under test to arrive at a sum of errors, and establishing whether said sum of errors identified in said message under test is less than or equal to a threshold.

7. A method for providing partial frame synchronization bit pattern detection as in claim 6, including the step of identifying said errors in said message under test by exclusive-ORing said message under test with a reference.

8. A method for providing partial frame synchronization bit pattern detection, comprising the steps of:

(1) rotating a received bit pattern;

(2) identifying errors in a message under test originating from said received bit pattern by exclusive-ORing said message under test with a reference;

(3) summing said errors in said message under test to arrive at a sum of errors;

(4) determining whether said sum of errors is less than or equal to a threshold and less than or equal to a defined upper bound; and (5) Performing the following steps responsive to a determination that the sum of the errors is greater than the threshold but less than or equal to the upper bound:

(a) dividing said message under test into bit groups such that each of said bit groups has an equal number of bits;

(b) rearranging said bit groups into bit group combinations comprising unique pairs of said bit groups, including a first bit group combination and a last bit group combination;

(c) identifying errors in the first bit group combination by exclusive-ORing said first bit group combination;

(d) summing said errors in said first bit group combination to arrive at a combination sum of errors for said first bit group combination;

(e) identifying errors in the next bit group combination by exclusive-ORing said next bit group combination;

(f) summing said errors in said next bit group combination to arrive at a combination sum of errors for said next bit group combination;

(g) Repeating steps e and f until the errors in the last bit group combination have been identified and summed;

(h) counting said bit group combinations having a combination sum of errors less than or equal to a partial threshold to arrive at a partial counter number; and (i) establishing whether said partial counter number is less than or equal to a counter threshold whereby if the counter number is less than or equal to the counter threshold that frame synchronization is found.

* * * * *